United States Patent
Kawakami

(10) Patent No.: US 8,031,904 B2
(45) Date of Patent: Oct. 4, 2011

(54) APPARATUS AND METHOD FOR IMAGE PROCESS

(75) Inventor: Haruko Kawakami, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1002 days.

(21) Appl. No.: 11/934,910

(22) Filed: Nov. 5, 2007

(65) Prior Publication Data

US 2009/0116743 A1    May 7, 2009

(51) Int. Cl.
*G06K 9/00* (2006.01)

(52) U.S. Cl. ........................................... 382/100

(58) Field of Classification Search .......... 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS

| 7,692,811 B2 * | 4/2010 | Tamai et al. ............... 358/1.18 |
| 2003/0058480 A1 * | 3/2003 | Miyake et al. ............ 358/426.1 |
| 2008/0104685 A1 * | 5/2008 | Ishiguro et al. ................ 726/7 |

FOREIGN PATENT DOCUMENTS

JP    2003-101761    4/2003

* cited by examiner

*Primary Examiner* — Samir Ahmed
*Assistant Examiner* — Atiba Fitzpatrick
(74) *Attorney, Agent, or Firm* — Turocy & Watson, LLP

(57) ABSTRACT

According to an embodiment, a ground process unit performs ground addition to input image data, and a pattern generation unit sets positions of components at plural points on a frequency plane including a main scanning axis and a sub scanning axis and converts the additional information into pattern data in which the positions of the components are a base. A pattern embedding unit embeds the pattern data from the pattern generation unit into a ground area of image data from the ground addition unit. A gradation process unit performs an asynchronous gradation process on the pattern embedding unit and output image data of the pattern embedding unit.

7 Claims, 4 Drawing Sheets

APPARATUS AND METHOD FOR IMAGE PROCESS

BACKGROUND OF THE INVENTION

1. Field of the Invention

The present invention relates to an apparatus and a method for an image process. Particularly, the invention relates to a technique to embed additional information in image information.

2. Description of the Related Art

Recently, for content such as still images or moving images, it is demanded that copyright protection is provided, and security against copying is provided. In order to respond to this demand, techniques in which additional information is embedded in content data and the embedded information is read are advanced. As one of the techniques, there is an electronic watermark technique.

As a technique to embed additional information in a still image, there is a method of using a lower bit of pixel data. In this method, since the lower bit of the pixel data is changed and the additional information is embedded, the pixel data in which the additional information is embedded is grasped as a minute change in pixel value. In this method, in the case where the still image is hard copied, the change in the pixel value appears as degradation of image quality, and it is not preferable in the case where the hard copy is performed.

As a technique to embed additional information in an image which is to be hard copied, there is a following technique. The additional information is represented by a periodic component and is embedded in image data. In order to check the additional information after this image data is printed on a sheet, when the image is read, Fourier transform is used to analyze the additional information.

Besides, when additional information is added to image data, the addition is performed by gradation processing the output image data. However, when the gradation process is the gradation process using a frequency near the resolution of a print output apparatus, there is a problem that certain detection can not be performed when the additional information is detected. Thus, there is a case where the Nyquist frequency of the print output apparatus which is hard to visually recognize can not be used.

As a technique to embed additional information in image data and as a technique to use an error diffusion system, there is a technique disclosed in JP-A-2003-101761.

BRIEF SUMMARY OF THE INVENTION

It is an object of an embodiment of the invention to provide an apparatus and a method for an image process in which additional information embedded in an image is hard to visually recognize, much information can be included as the additional information, and the additional information can be detected from the image with high accuracy.

According to an aspect of the invention, there are included a ground addition unit to basically perform ground addition to input image data, a pattern generation unit to set positions of components at plural points on a frequency plane including a main scanning axis and a sub scanning axis and to convert the additional information into pattern data in which the positions of the components are a base, a pattern embedding unit to embed the pattern data from the pattern generation unit into a ground area of image data from the ground addition unit, and a gradation process unit to perform an asynchronous gradation process on output image data of the pattern embedding unit.

Additional objects and advantages of of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
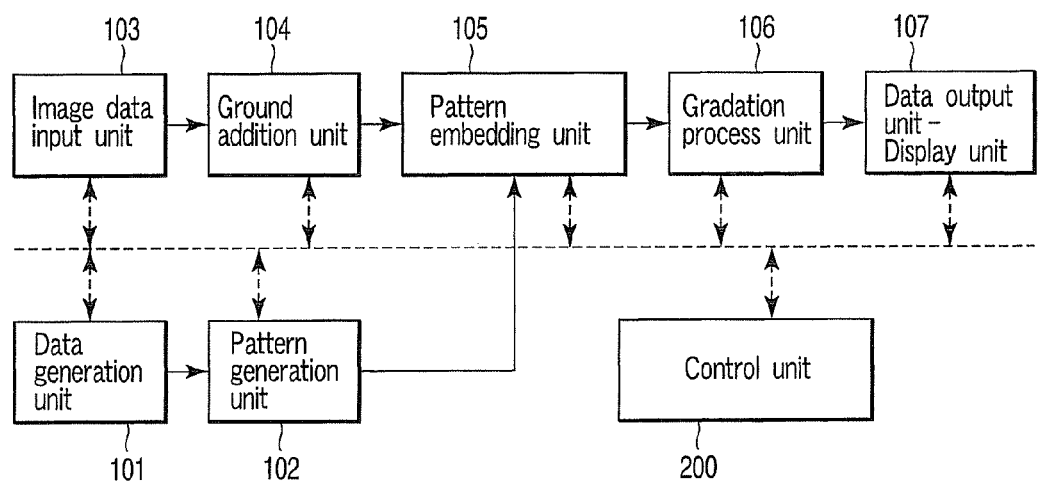
FIG. 1 is a structural explanatory view showing an embodiment of the invention.

Hereinafter, an embodiment of the invention will be described with reference to the drawings. In FIG. 1, reference numeral 103 denotes an image data input unit. The image data input unit 103 receives, for example, image data as an object of hard copy, or image data from an optical reading apparatus or a micro-computer or a network.

Output image data from the image data input unit 103 is inputted to a ground addition unit 104. In the ground addition unit 104, a background color area (for example, a white area) of the image data is detected. Then, a ground process for embedding additional information in the data of the background color area is performed. Specifically, the process is performed so that the data of the background color area has an intermediate value level (ground) between a level in a positive direction and a level in a negative direction of the additional information. The process of the signal value, that is, the ground is performed as stated above, so that later embedding of pattern data is facilitated.

The image data outputted from the ground addition unit 104 is inputted to a pattern embedding unit 105. Here, the additional information is embedded in the background color area. Data outputted by a data generation unit 101 is data as described below. It is, for example, previously set information, such as data creation date information or identification information of a data creation apparatus, or is information created by the user. As the information created by the user, there is information relating to image data, title information, copyright information or the like.

The data outputted from the data generation unit 101 is inputted to a pattern generation unit 102. The pattern generation unit 102 converts the input data into pattern data having arrangement positions of specific frequency components and outputs it.

The output pattern data of the pattern generation unit 102 is inputted to the pattern embedding unit 105, and is embedded in the background color area of the image data. However, in the case where the ground has an intermediate density level or a natural picture, the embedding of the pattern data is not performed. Next, the output image data of the pattern embedding unit 105 is inputted to a gradation process unit 106, and an error diffusion process is performed. Besides, a gradation process suitable for a data output unit-display unit 107 is performed. The output image data of the gradation process unit 106 is inputted to the data output unit-display unit 107. A control unit 200 performs timing signal, process instructions and the like to the respective blocks.

Figure 2:
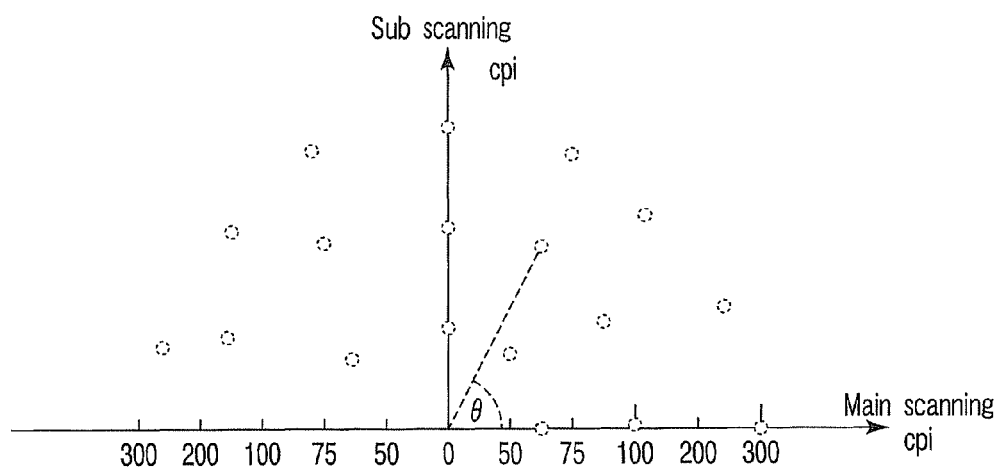
FIG. 2 is an explanatory view showing an example of an arrangement pattern of frequency components in a pattern generation unit of FIG. 1.

FIG. 2 shows an example of the arrangement (positions of circular marks), on a frequency plane, of the periodic components to be embedded in the image data. The pattern generation unit 102 has this frequency characteristic. In FIG. 2, the vertical axis indicates a sub scanning axis, and the unit is cycle per inch (cpi). The horizontal axis indicates a main scanning axis, and the unit is cycle per inch (cpi). The main scanning axis and the sub scanning axis correspond to vertical and horizontal print scanning directions in a printer.

The positions (angle, frequency, etc.) of plural periodic components to be set on the frequency plane are selected so that they do not interfere with each other. For example, a position (x, y) of a periodic component is expressed by $X = P \cos\theta \cdot \cos(2n/n)$, $Y = P \sin\theta \cdot \cos(2n/n)$, n=(period of input component)cpi/(resolution of printer)cpi, power (P)=(amplitude of input component)/(m-th power of 2), and m denoting the number of bits of the input component.

Figure 3:
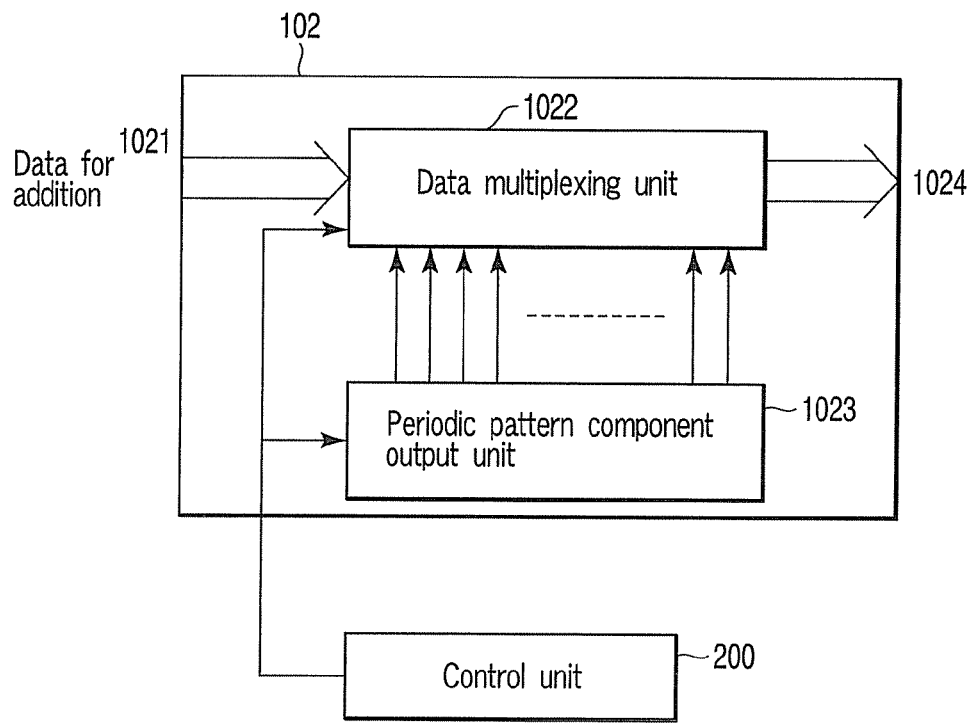
FIG. 3 is a view showing a structural example of a pattern generation unit 102.

FIG. 3 shows a structural example of the pattern generation unit 102. A periodic pattern component output unit 1023 periodically outputs the components (for example, values of reference levels) of the frequency arrangement positions shown in FIG. 2. The respective components are inputted to a data multiplexing unit 1022. Data for addition is inputted to the data multiplexing unit 1022. Here, the data for addition is, for example, a value of +5 at "0", and a value of −5 at "1", is multiplexed to the pattern component (value of the reference level), and is outputted to an output terminal 1024. Control timings of these are controlled by the control unit 200.

Figure 4:
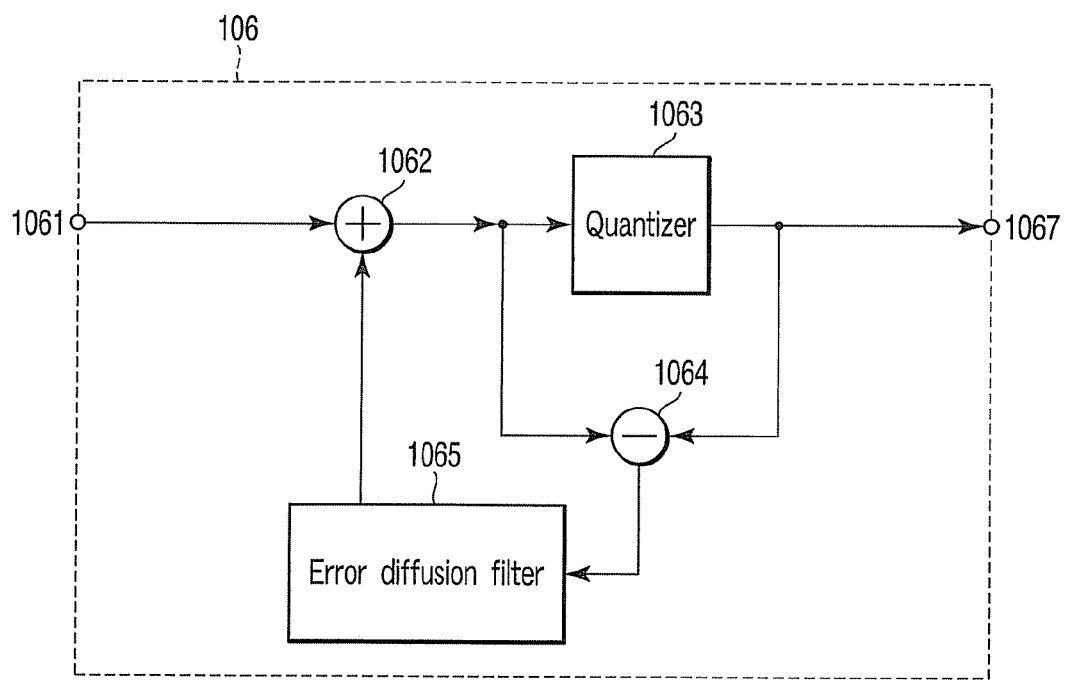
FIG. 4 is a view showing a structural example and an operation example of a gradation process unit 106 of FIG. 1.

FIG. 4 shows a principle structural example of the gradation process unit 106. The data (image data of continuous gradation) before the gradation process from the pattern embedding unit 105 is inputted to an adder 1062 through an input terminal 1061. In the adder 1062, the input data and data from an error diffusion filter 1065 are added to each other and are outputted. The output data of the adder 1062 is inputted to a quantizer 1063 and a subtracter 1064. In the subtracter 1064, a subtraction process of the input and the output of the quantizer 1063 is performed, and a difference output value is given to the diffusion filter 1065. In the quantizer process unit 1063, quantization into N values is performed according to the gradation number N of the data output unit-display unit 107. The diffusion filter 1065 multiplies the output value of the subtracter 1064 by an error diffusion filter coefficient. The quantization may be performed with binary values or multi-values.

Figure 5A:
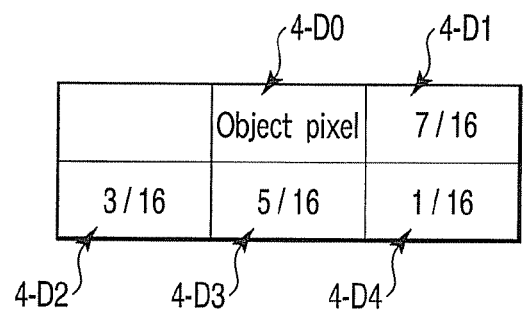
FIG. 5A and FIG. 5B are views showing a setting example and an operation example of coefficients of an error diffusion filter of FIG. 4.

FIG. 5A schematically shows a basic operation of the error diffusion filter 1065. That is, for example, with respect to four pixels around an object pixel 4-D0, diffusion information 4-D1, 4-D2, 4-D3 and 4-D4 obtained by difference information between the object pixel 4-D0 and the original pixel are generated. By this, a partial component of the object pixel 4-D0 is transmitted to the four peripheral pixels to be processed subsequently to the object pixel 4-D0. This means that the density of the whole image is compensated. Incidentally, although the description has been made on the assumption that the pixels to which a part of the object pixel 4-D0 is transmitted are four peripheral pixels, no limitation is made to this numerical value.

Figure 5B:
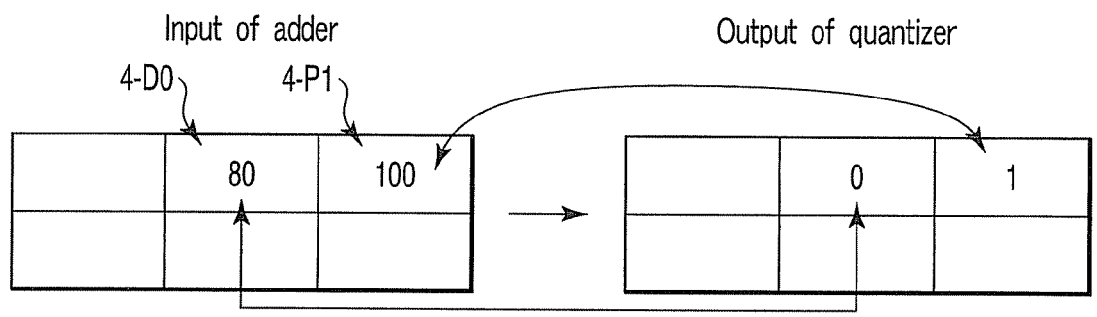

A further simplified explanation will be added as follows. Now, it is assumed that plural pixels as shown in FIG. 5B are inputted to the adder 1062. It is assumed that the output of the error diffusion filter 1065 is zero. It is assumed that the pixel has a value in a range of from 0 to 255.

It is assumed that on a base of 128, the quantizer 1063 quantizes a pixel of a value smaller than 128 as "0", and quantizes a pixel of a value not smaller than 128 as "1". Now, it is assumed that the symmetrical pixel has a value of 80. Then, when a difference between values before the quantization and after the quantization of the object pixel is taken, 80 is obtained from the subtracter 1064. The difference value of 80 is inputted to the error diffusion filter 1065. It is assumed that a value of a pixel 4-P1 next to the object pixel is 100. Besides, it is assumed that a coefficient in the error diffusion filter 1065 is (7/16). Then, the diffusion information 4-D1 of 80×(7/16)=35 is added to the pixel 4-P1 (value of 100) in the adder 1062. Then, the pixel 4-P1 has a value of (100+35=135), and is inputted to the quantizer 1063. Then, since the quantizer 1063 outputs "1" as the quantized value because of 135>128. That is, a partial component of the object pixel 4-D0 is transmitted to a subsequently processed pixel.

As stated above, the method and the apparatus of the embodiment, with respect to the embedding process of the additional information, the data pattern having the periodic components which do not interfere with each other is used. On the other hand, in the gradation process, a non-periodic process system having relatively few periodic components, for example, the error diffusion process is used. As the non-periodic process system, there is also a blue noise mask method. In this method, the distribution of a pseudo random pattern is operated, so that the spatial frequency distribution becomes higher than the spatial frequency perceived by the human sense of sight. This method is included in a density pattern method or a systematic dithering method.

As a result, the interference between the additional information and the gradation pattern by the gradation process is prevented. Thus, when the printed matter of the image data is read by the optical reading apparatus (scanner), the extraction of the additional information can be performed with high accuracy. Besides, in the embodiment of the invention, an unremarkable high frequency can be used as the frequency pattern component to carry the additional information, and the extraction accuracy is also high, and therefore, the amplitude of the pattern component of the additional information can be made smaller than that of the related art. This means that the pattern component of the additional information is visually unnoticeable on the printed matter.

Figure 6:
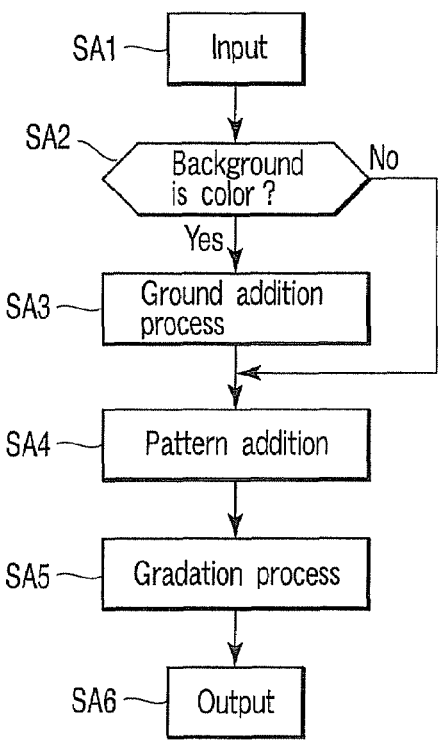
FIG. 6 is a flowchart showing an operation of an apparatus of FIG. 1 and showing process steps at the time when the apparatus of FIG. 1 is realized by software.

FIG. 6 shows an operation explanation of the apparatus and shows a flowchart at the time when the apparatus is realized by software. When image data is inputted, the ground process is executed (step SA1, SA2). In the ground process, it is determined whether or not the background is white (step SA3), and when it is white, the ground addition process is performed (step SA4). As described before, in the ground addition process, the reference level is set to facilitate the embedding of pattern data. Next, the pattern addition process is performed on the image data (step SA4). The image data on which the pattern addition process has been performed is subjected to the gradation process (step SA5), and is subjected to the output process (step SA6).

Figure 7:
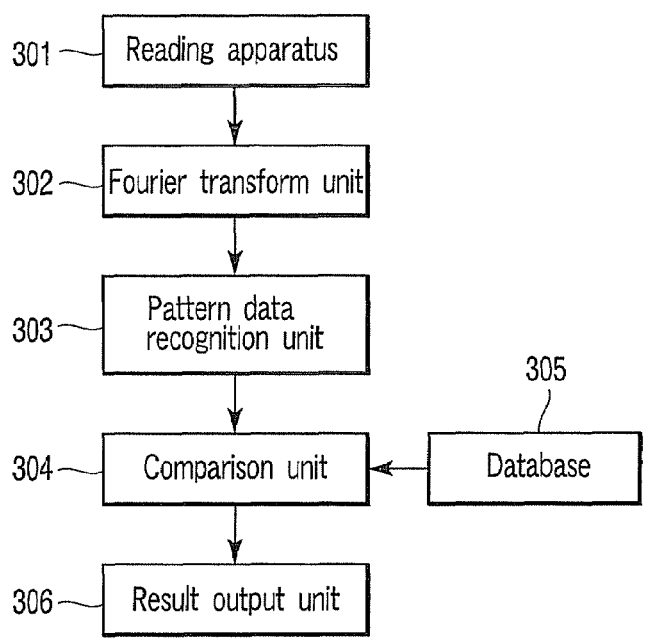
FIG. 7 is a view showing an example of a process block for extracting additional information from a print paper printed by the apparatus of FIG. 1.

FIG. 7 shows a process block in which after the image data processed as described above is printed by the printer, the print paper is read. Especially, in FIG. 6, the recognition path of the additional information is chosen and is shown.

The image data read by a reading apparatus 301 is subjected to Fourier transform in a Fourier transform unit 302. The image data subjected to the Fourier transform is inputted to a pattern data recognition unit 303.

The pattern data recognition unit 303 extracts the pattern data based on the frequency characteristic explained in FIG. 2. That is, the data existing on the pattern shown in FIG. 2 is extracted. The pattern data is taken in a comparison unit 304 by a previously set comparing area. In the comparison unit 304, comparison is made with data of a database by the comparing area. The data of the database is, for example, previously set information such as data creation date information or identification information of a creation apparatus of data, and information created by the user.

When there is pattern data coincident with the data of the database, a coincidence determination signal is outputted to a result output unit 306. When the coincidence signal is not obtained, it can be determined that the read image data is, for example, an illegal copy.

Incidentally, the invention is not limited to the embodiment described above, but can be embodied while modifying components within the scope not departing from the gist thereof at the practical phase. Besides, various inventions can be formed by appropriate combinations of plural components disclosed in the embodiment. For example, some components may be deleted from all components described in the embodiment. Further, components in different embodiments may be suitably combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image process apparatus, comprising: a ground addition unit configured to perform ground addition to input image data;
a pattern generation unit configured to set positions of components at a plurality of points on a frequency plane including a main scanning axis and a sub scanning axis and to convert additional information into pattern data in which the positions of the components are a base;
a pattern embedding unit configured to embed the pattern data from the pattern generation unit into a ground area of image data from the ground addition unit; and
a gradation process unit configured to perform an asynchronous gradation process on output image data of the pattern embedding unit.

2. The image process apparatus according to claim 1, wherein the pattern generation unit includes a periodic pattern component output unit, and a pattern indicating the positions of the components at the plurality of points on the frequency plane is outputted with periodicity.

3. The image process apparatus according to claim 1, wherein the gradation process unit adopts an error diffusion system to perform a non-periodic gradation process.

4. The image process apparatus according to claim 1, wherein the gradation process unit adopts a blue noise mask system to perform a non-periodic gradation process.

5. An image process method for an image process apparatus including a ground addition unit configured to perform ground addition to input image data, a pattern generation unit configured to convert additional information into pattern data, a pattern embedding unit configured to embed the pattern data from the pattern generation unit into a ground area of image data from the ground addition unit, and a gradation process unit configured to perform a gradation process on output image data of the pattern embedding unit, wherein
in the pattern generation unit,
positions of components are set at a plurality of points on a frequency plane including a main scanning axis and a sub scanning axis, and
the additional information is converted into the pattern data in which the positions of the components is a base, and
in the gradation process unit,
the output image data of the pattern embedding unit is asynchronously subjected to the gradation process.

6. The image process method according to claim 5, wherein as the pattern data, a periodic pattern component is used, and a pattern indicating the positions of the components at the plurality of points on the frequency plane has a periodicity.

7. The image process method according to claim 5, wherein the gradation process adopts a blue noise mask system to perform a non-periodic gradation process.

* * * * *